United States Patent
Ho et al.

(10) Patent No.: US 10,590,303 B2
(45) Date of Patent: Mar. 17, 2020

(54) THERMOPLASTIC POLYURETHANE COMPOSITIONS, ARTICLES, AND METHODS THEREOF

(71) Applicant: 3M INNOVATIVE PROPERTIES COMPANY, St. Paul, MN (US)

(72) Inventors: Charlie C. Ho, Woodbury, MN (US); Robert D. Hamann, Eagan, MN (US); Jeremy P. Gundale, Woodbury, MN (US); Vijay Rajamani, Minneapolis, MN (US); Ken Egashira, Kanagawa (JP); Chia Hui Lin, Tainan (TW); Hsi Shou Kuo, Taoyuan (TW)

(73) Assignee: 3M Innovative Properties Company, St. Paul, MN (US)

( * ) Notice: Subject to any disclaimer, the term of this patent is extended or adjusted under 35 U.S.C. 154(b) by 165 days.

(21) Appl. No.: 15/328,530

(22) PCT Filed: Jul. 24, 2015

(86) PCT No.: PCT/US2015/041981
§ 371 (c)(1),
(2) Date: Jan. 24, 2017

(87) PCT Pub. No.: WO2016/018749
PCT Pub. Date: Feb. 4, 2016

(65) Prior Publication Data
US 2017/0218226 A1    Aug. 3, 2017

Related U.S. Application Data

(60) Provisional application No. 62/031,426, filed on Jul. 31, 2014.

(51) Int. Cl.
C09D 175/06     (2006.01)
B29C 48/08     (2019.01)
(Continued)

(52) U.S. Cl.
CPC .......... *C09D 175/06* (2013.01); *B29C 48/022* (2019.02); *B29C 48/08* (2019.02);
(Continued)

(58) Field of Classification Search
None
See application file for complete search history.

(56) References Cited

U.S. PATENT DOCUMENTS

RE24,906 E     12/1960 Ulrich
4,418,120 A    11/1983 Kealy et al.
(Continued)

FOREIGN PATENT DOCUMENTS

DE    261098    6/1913
DE    2447368   4/1976
(Continued)

OTHER PUBLICATIONS

Saiani, "Origin of Multiple Melting Endotherms in a High Hard Block Content Polyurethane. 1. Thermodynamic Investigation," Macromolecules, 2001, vol. 34, No. 26, pp. 9059-9068.
(Continued)

*Primary Examiner* — Monica A Huson
(74) *Attorney, Agent, or Firm* — Philip P. Soo

(57) ABSTRACT

Disclosed herein are improved thermoplastic polyurethane compositions, articles, and related methods. These compositions include aliphatic thermoplastic polyurethanes having a hard segment content ranging from 57 percent to 80 percent by weight. The hard coat compositions have a Shore D hardness of at least 70 and can display an Elongation at Break test result at 25 degrees Celsius of at least 150 percent. These materials, when hardened, can serve decorative and/or protective functions while displaying both a high degree of elongation at moderate temperatures and high hardness.

20 Claims, 1 Drawing Sheet

(51) Int. Cl.

| | | |
|---|---|---|
| *B29C 48/00* | (2019.01) | |
| *B32B 7/12* | (2006.01) | |
| *B32B 27/40* | (2006.01) | |
| *B29C 51/14* | (2006.01) | |
| *C08G 18/75* | (2006.01) | |
| *C08G 18/42* | (2006.01) | |
| *B32B 27/08* | (2006.01) | |
| *B32B 27/30* | (2006.01) | |
| *C08G 18/66* | (2006.01) | |
| *B32B 27/36* | (2006.01) | |
| *C09J 7/25* | (2018.01) | |
| *B29C 51/10* | (2006.01) | |
| *B29K 75/00* | (2006.01) | |
| *B29L 9/00* | (2006.01) | |
| *B29L 31/30* | (2006.01) | |
| *B29L 31/00* | (2006.01) | |

(52) U.S. Cl.
CPC .............. *B29C 51/10* (2013.01); *B29C 51/14* (2013.01); *B32B 7/12* (2013.01); *B32B 27/08* (2013.01); *B32B 27/304* (2013.01); *B32B 27/308* (2013.01); *B32B 27/36* (2013.01); *B32B 27/40* (2013.01); *C08G 18/4238* (2013.01); *C08G 18/4277* (2013.01); *C08G 18/664* (2013.01); *C08G 18/758* (2013.01); *C09J 7/25* (2018.01); *B29K 2075/00* (2013.01); *B29K 2995/007* (2013.01); *B29K 2995/0077* (2013.01); *B29L 2009/00* (2013.01); *B29L 2031/3005* (2013.01); *B29L 2031/722* (2013.01); *B32B 2250/24* (2013.01); *B32B 2255/10* (2013.01); *B32B 2255/26* (2013.01); *B32B 2307/30* (2013.01); *B32B 2307/50* (2013.01); *B32B 2307/536* (2013.01); *B32B 2307/54* (2013.01); *B32B 2307/546* (2013.01); *B32B 2307/554* (2013.01); *B32B 2307/558* (2013.01); *B32B 2307/5825* (2013.01); *B32B 2307/712* (2013.01); *B32B 2307/714* (2013.01); *B32B 2451/00* (2013.01); *B32B 2605/00* (2013.01); *C09J 2201/606* (2013.01); *C09J 2475/006* (2013.01)

(56) References Cited

U.S. PATENT DOCUMENTS

| | | |
|---|---|---|
| 4,597,927 A | 7/1986 | Zeitler et al. |
| 4,619,867 A | 10/1986 | Charbonneau et al. |
| 4,648,689 A * | 3/1987 | May .................... E01F 9/578 359/538 |
| 4,789,566 A | 12/1988 | Tatsuno |
| 4,835,217 A | 5/1989 | Jorgensen et al. |
| 4,948,859 A | 8/1990 | Echols et al. |
| 5,059,269 A | 10/1991 | Hu et al. |
| 5,374,704 A | 12/1994 | Müller et al. |
| 5,405,675 A | 4/1995 | Sawka et al. |
| 5,458,935 A | 10/1995 | Alzner |
| 5,468,532 A | 11/1995 | Ho et al. |
| 5,480,946 A | 1/1996 | Mueller |
| 5,656,713 A | 8/1997 | Sarpeshkar et al. |
| 5,795,948 A | 8/1998 | Heidingsfied et al. |
| 5,905,133 A | 5/1999 | Müller et al. |
| 6,294,637 B1 | 9/2001 | Braüer et al. |
| 6,383,644 B2 | 5/2002 | Fuchs |
| 6,444,317 B1 | 9/2002 | Haruta |
| 6,607,831 B2 | 8/2003 | Ho et al. |
| 7,588,707 B2 | 9/2009 | Belliveau et al. |
| 8,128,779 B2 | 3/2012 | Ho et al. |
| 8,551,285 B2 | 10/2013 | Ho et al. |
| 2004/0087754 A1 | 5/2004 | Foley et al. |
| 2004/0102599 A1 | 5/2004 | Kaufhold et al. |
| 2004/0224101 A1* | 11/2004 | Johnson ................ B29C 51/002 428/29 |
| 2011/0229681 A1 | 9/2011 | Sakamoto et al. |
| 2013/0004775 A1 | 1/2013 | Vu |
| 2013/0259934 A1 | 10/2013 | Schwarz |

FOREIGN PATENT DOCUMENTS

| | | |
|---|---|---|
| DE | 4022741 | 1/1992 |
| EP | 0708124 | 4/1996 |
| EP | 0900812 | 3/1999 |
| JP | 2001-225414 A | 8/2001 |
| JP | 2015-138150 A | 7/2015 |
| WO | WO 87/00189 | 1/1987 |
| WO | WO 2008/042883 | 4/2008 |
| WO | WO 2009/120548 | 10/2009 |
| WO | WO 2010/110784 | 9/2010 |
| WO | WO 2011/125540 | 10/2011 |
| WO | WO 2012/160894 | 11/2012 |
| WO | WO 2013/019706 | 2/2013 |
| WO | WO 2013/019766 | 2/2013 |
| WO | WO 2014/150305 | 9/2014 |
| WO | WO 2015/148772 | 10/2015 |

OTHER PUBLICATIONS

Saiani, "Origin of Multiple Melting Endotherms in a High Hard Block Content Polyurethane. 2. Structural Investigation," Macromolecules, 2004, vol. 37, No. 04, pp. 1411-1421.

Saiani, "Origin of Multiple Melting Endotherms in a High Hard Block Content Polyurethane: Effect of Annealing Temperature," Macromolecules, 2007, vol. 40, No. 20, pp. 7252-7262.

International Search Report for PCT International Application No. PCT/US2015/041981, dated Oct. 30, 2015, 4 pages.

Chaffin, K.A., et al., "Influence of Water on the Structure and Properties of PDMS-Containing Multiblock Polyurethanes", Macromolecules, vol. 45, No. 22, (Nov. 13, 2012), pp. 9110-9120, XP055578189.

Katsuki, K. et al., "Laminated sheet composed of thin glass and plastic sheets", Journal of Non-Crystalline Solids, North-Holland Publishing Company, vol. 42, No. 1-3, (Oct. 1, 1980), pp. 619-636, XP025462375.

Kang, J., et al., "Hydrolytically stable polyurethanes", Journal of Polymer Science, Part A: Polymer Chemistry, vol. 53, No. 1, (Jan. 1, 2015), pp. 1-4, XP055578178.

* cited by examiner

THERMOPLASTIC POLYURETHANE COMPOSITIONS, ARTICLES, AND METHODS THEREOF

CROSS REFERENCE TO RELATED APPLICATIONS

This application is a national stage filing under 35 U.S.C. 371 of PCT/US2015/041981, filed Jul. 24, 2015, which claims the benefit of U.S. Provisional Application No. 62/031,426, filed Jul. 31, 2014, the disclosures of which are incorporated by reference in their entireties herein.

FIELD OF THE INVENTION

Provided are polyurethane compositions, films derived therefrom, and related methods. More particularly, the provided polyurethane compositions are thermoplastic polyurethanes suitable for protective and decorative film applications.

BACKGROUND

Polyurethanes represent a broad family of polymers with great commercial and industrial importance. While these materials can be formulated to have a wide range of material properties, polyurethanes are well known for their abrasion resistance, toughness, flexibility, impact resistance, tear strength, and chemical resistance. Principal applications include films, coatings, elastomers, and foams. Films and coatings can be especially advantageous in protecting substrates from environmental weathering, chemical exposure, heat, and/or abrasion. Polyurethanes can also be engineered to be highly transparent and, if desired, can be formed into films and coatings with graphic arts for decorative applications.

Chemically, polyurethanes are distinguished by their characteristic carbamate (—NH—CO—O—) linkages and are generally prepared by reacting a multifunctional isocyanate with a multifunctional diol, or more generally polyol, with the presence of a catalyst. There are two general types of polyurethanes, thermoset and thermoplastic. Thermoset polyurethanes are highly crosslinked by covalent bonds. Thermoplastic polyurethanes are characterized by linear polymeric chains having self-ordering block structures. These polyurethanes are generally uncrosslinked but can also be lightly crosslinked. The block structures of a thermoplastic polyurethane generally include alternating "hard" and "soft" segments covalently bonded to each other end-to-end. The hard segments aggregate to form crystalline regions that act like physical crosslinks at ambient temperatures, but convert to a molten state upon heating. As a result, thermoplastic polyurethanes are well suited for thermoforming onto three dimensional articles and can be easily reprocessed.

Certain advantageous applications of polyurethanes relate to their use in hard coat applications. These include, for example, paint protection films or paint replacement films that protect the exterior surface of an automotive vehicle from harsh environmental conditions. Such conditions include impingement from stones, sand, debris, and insects, as well as general outdoor weathering, which can substantially degrade an automotive exterior over time. Composite polyurethane films have been previously described in U.S. Pat. No. 5,405,675 (Sawka et al.); U.S. Pat. No. 5,468,532 (Ho et al.); U.S. Pat. No. 6,607,831 (Ho); U.S. Pat. No. 6,383,644 (Fuchs); and International Patent Publication No. WO 2008/042883 (Ho et al.).

SUMMARY

With respect to hard coat applications, thermoset and thermoplastic polyurethane materials present competing advantages and drawbacks. Thermoplastic paint protection films can meet minimum performance requirements but stand to benefit from increased stain resistance, chemical resistance, and ultraviolet light (UV) stability. Thermoset polyurethanes generally display a high degree of stain, chemical, and UV resistance but require multiple coating steps, driving up manufacturing costs, and has a high film modulus that can impede its ability to stretch and conform to the irregular contours of an automotive vehicle. Moreover, achieving both a high degree of hardness and elongation simultaneously is a technical problem that has not been adequately addressed by prior art thermoplastic polyurethane materials.

Disclosed herein are improved thermoplastic polyurethane compositions, articles, and related methods. These compositions were found to display surprisingly high stain, abrasion, scratch, UV, and resistance to glass treatment chemicals when compared to existing hard coat compositions, while also providing very high degrees of elongation at high levels of hardness. The processibility of these materials makes them particularly suitable for dual vacuum thermoforming (sometimes referred to as vacuum contact bonding) parts for protective and decorative applications. Moreover, these polyurethanes show excellent adhesion to softer reactive extruded thermoplastic polyurethane coatings, enabling hybrid composite film constructions with a variety of potential applications, ranging from black out film to dual vacuum thermoformed parts.

In one aspect, a hard coat composition is provided. The hard coat composition comprises: an aliphatic thermoplastic polyurethane having a hard segment content ranging from 57 percent to 80 percent by weight, wherein the hard coat composition has a Shore D hardness of at least 70 and an Elongation at Break test result at 25 degrees Celsius of at least 150 percent.

In another aspect, a composite film is provided, comprising: a hard coat layer having opposing first and second major surfaces and comprising the aforementioned hard coat composition; and an adhesive layer extending across at least a portion of the second major surface.

In still another aspect, a method of applying a composite film to a substrate is provided, comprising: forming a hard coat layer comprising an aliphatic polyurethane layer having a hard segment content ranging from 57 percent to 80 percent by weight, the aliphatic polyurethane having a Shore D hardness of at least 70 and an Elongation at Break test result of at least 150 percent; disposing an adhesive layer across a major surface of the hard coat layer; and bonding the adhesive layer to the substrate.

DEFINITIONS

Figure 1:
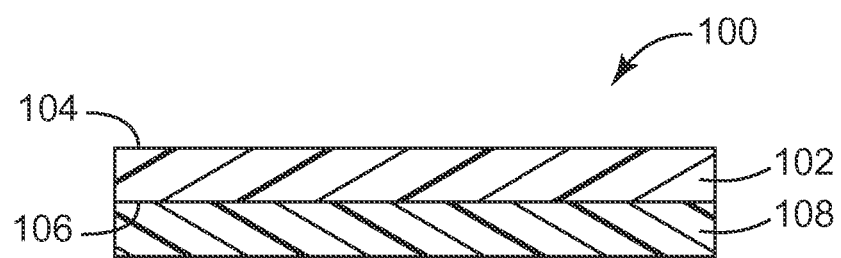
FIGS. 1-4 show cross-sectional elevational views of composite films according to various embodiments.

As used herein:

"ambient conditions" means at a temperature of 25 degrees Celsius and a pressure of 1 atmosphere (approximately 100 kilopascals);

"catalyst" means a substance that can increase the speed of a chemical reaction;

"diol" means a compound having a hydroxyl functionality of exactly two;

"diisocyanate" means a compound having an isocyanate functionality of exactly two;

"harden" means to alter the physical state and or chemical state of the composition to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;

"hardenable" means capable of being hardened;

"polyisocyanate" means a compound having an isocyanate functionality of two or more;

"polyol" means a compound having a hydroxyl functionality of two or more; and

"short-chain diol" means a diol having a weight average molecular weight of at most 185 g/mol.

DETAILED DESCRIPTION

As used herein, the terms "preferred" and "preferably" refer to embodiments described herein that may afford certain benefits under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art.

It is noted that the term "comprises" and variations thereof do not have a limiting meaning where these terms appear in the accompanying description. Moreover, "a," "an," "the," "at least one," and "one or more" are used interchangeably herein.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way. Figures are not necessarily to scale.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" throughout this specification are not necessarily referring to the same embodiment of the invention. Furthermore, the particular features, structures, materials, or characteristics may be combined in any suitable manner in one or more embodiments.

Film Constructions

A composite film according to one exemplary embodiment is illustrated in FIG. 1 and designated by the numeral 100. The composite film 100 includes a hard coat layer 102 having a top surface 104 and a bottom surface 106. The composite film 100 further includes a base layer 108 extending across the bottom surface 106 of the hard coat layer 102. Optionally and as shown, the base layer 108 and hard coat layer 102 are laminated to each other such that the layers 102, 108 directly contact each other along essentially the entire bottom surface 106. If desired, the base layer 108 may contact the hard coat layer 102 along only a portion of the bottom surface 106.

While the base layer 108 is depicted as having a rectilinear geometry in FIG. 1, it may take on any of a number of different configurations. For example, the base layer 108 may have three-dimensional contours that include regions of positive and/or negative curvature. Exemplary base layers include sheets, decorative articles, graphics, metallic vapor coats, acrylic color coats, and combinations thereof. Even if the base layer 108 is formed as a flat sheet, it can be subsequently die-cut, thermoformed, embossed, or otherwise formed into a shape different from its original shape. While not shown here, an adhesive or mechanical device could be used to fasten the base layer 108 to a separate substrate.

The hard coat layer 102 can be provided in any suitable thickness based on the application at hand. Typically, the hard coat layer 102 has a thickness that ranges from 5 micrometers to 300 micrometers. A typical overall film thickness for protective films formed over automotive body panels is at least 50 micrometers, at least 75 micrometers, or at least 100 micrometers. In the same or alternative embodiments, film thickness is at most 1.27 millimeters, at most 1.1 millimeters, or at most 1.0 millimeters.

Figure 2:
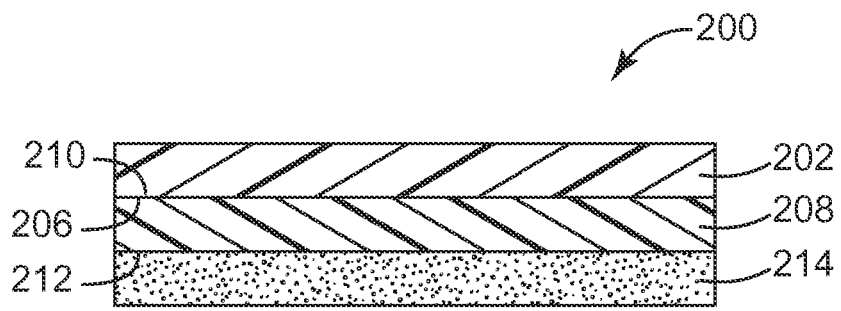

FIG. 2 shows a composite film 200 according to another embodiment having three layers instead of two. Like the embodiment of FIG. 1, the composite film 200 includes a hard coat layer 202 and base layer 208 contacting each other along a bottom surface 206 of the hard coat layer 202. The base layer 208 has a top surface 210 and a bottom surface 212. An adhesive layer 214 contacts and extends along the bottom surface 212 of the base layer 208.

Figure 3:
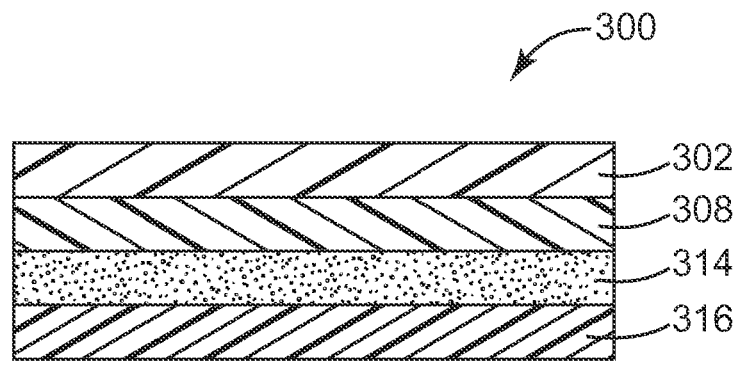

FIG. 3 shows a composite film 300 according to still another embodiment in which a hard coat layer 302 is disposed on a base layer 308, which is in turn disposed on an adhesive layer 314. As shown, the adhesive layer 314 is disposed on an underlying substrate 316. Like the base layers 108, 208, 308, however, there is no particular limitation on the size or shape of the substrate 316.

Figure 4:
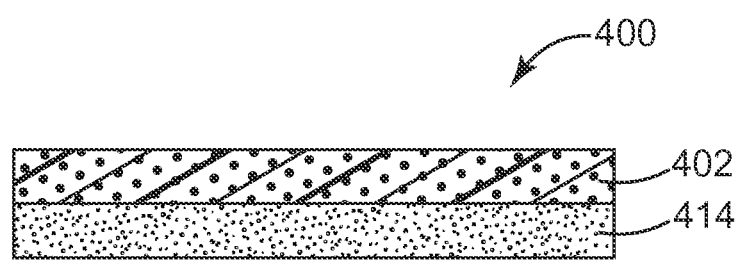

FIG. 4 shows a bilayer composite film 400 according to yet another embodiment where the hard coat layer is highly filled to form an opaque "black out" film. Such films could be suitable, for example, in paint replacement films for automotive applications. The composite film 400, as depicted, includes a hard coat layer 402 directly coated onto an adhesive layer 414. The hard coat layer 402 differs from those described above in that it is highly filled with a black pigment or dye to render the overall film opaque. In black out film applications, the adhesive layer 414 is commonly a pressure sensitive adhesive layer, but other adhesives are also possible.

Although not illustrated in the above figures, composite films having exposed adhesive layer surfaces (for example, adhesive layers 214, 414) may further include a release liner extending across and contacting the adhesive layer surfaces. The release liner is releasably bonded on at least a portion of the adhesive layer such that the adhesive layer is interposed between the hard coat layer and the release liner. This configuration protects the adhesive layer and facilitates handling of the composite film.

One or more additional layers may be coated or laminated to either major surface of the composite film. Alternatively, one or more intermediate layers may be interposed between any two adjacent layers present in the composite film. Such layer or layers may be similar to those described above or may be structurally or chemically distinct. Distinct layers could include, for example, extruded sheets of a different polymer, metal vapor coatings, printed graphics, particles, and primers, and may be continuous or discontinuous. For example, in FIG. 2, a tie layer may be disposed between the base layer 208 and the adhesive layer 214 to improve the quality of adhesion between the two layers.

If desired, the composite film 100, 200, 300 could be laminated onto a substrate, such as a vehicular body panel, with the base layer 108, 208, 308 contacting the substrate to provide a coated article. Alternatively, the base layer 108, 208, 308 could be provided in a configuration in which it is already adhered or otherwise coupled to the substrate. In some embodiments, the substrate is a polymeric substrate having three-dimensional contours. Useful substrates may include, for example, injection molded substrates having a shape of an interior component in an automotive vehicle.

One or more additional layers could be permanently or temporarily disposed on the outward-facing surface of the hard coat layer 102, 202, 302, 402. For instance, the hard coat layer may itself comprise multiple hard coat layers. Like the hard coat layer 102, 202, 302, any of the other layers described herein could be dyed or pigmented to alter the outward appearance of the composite film.

Further details concerning the chemical composition of the aforementioned hard coat layers, base layers, adhesive layers, and other supplemental layers are described below.
Hard Coat Compositions Typically on the exposed outer surface of a composite film, the hard coat layer is comprised of a polyurethane layer synthesized by polymerizing at least one polyisocyanate and at least one polyol.

Polyols used in polyurethane synthesis include, for example, polyester polyols, polycarbonate polyols, and combinations thereof. Examples of suitable polyols include materials commercially available under the trade designation DESMOPHEN from Bayer Corporation (Pittsburgh, Pa.). The polyols can be polyester polyols (for example, DESMOPHEN 63 IA, 650A, 65 IA, 670A, 680, 110, and 1150); polyether polyols (for example, DESMOPHEN 550U, 1600U, 1900U, and 1950U); or acrylic polyols (for example, DEMOPHEN A 160SN, A575, and A450BA/A); polycaprolactone polyols such as, for example, caprolactone polyols available under the trade designation TONE from Dow Chemical Co. (Midland, Mich.) (for example, TONE 200, 201, 230, 2221, 2224, 301, 305, and 310) or under the trade designation CAPA from Solvay (Warrington, Cheshire, United Kingdom) (for example, CAPA 2043, 2054, 2100, 2121, 2200, 2201, 2200A, 2200D, 2100A, 3031, 3091, and 3051); polycarbonate polyols (for example, polycarbonate polyols available under the trade designations PC-1122, PC-1167, and PC-1733 from Picassian Polymers (Boston, Mass.) or under the trade designation DESMOPHEN 2020E from Bayer Corp.); and combinations thereof.

Of the above, certain aliphatic polyol species were observed to provide particular advantageous properties, including solvent resistance, stain resistance, self-healing, and resistance to yellowing when exposed to ultraviolet and visible light over long periods of time. These species include aliphatic polyester polyols, polycaprolactone polyols, polycarbonate polyols, polyether polyols, polyolefin polyols, along with copolymers and mixtures thereof.

Examples of polyisocyanates include: aromatic diisocyanates (for example, 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3', 5,5'-tetraethyl) diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (for example, m-xylylene diisocyanate and tetramethyl-m-xylylene diisocyanate); aliphatic diisocyanates (for example, 1,4-diisocyanatobutane; 1,6-diisocyanatohexane; 1,12-diisocyanatododecane; and 2-methyl-1,5-diisocyanatopentane); cycloaliphatic diisocyanates (for example, methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), polymeric or oligomeric compounds (for example, polyoxyalkylene, polyester, polybutadienyl, and the like) terminated by two isocyanate functional groups (for example, the diurethane of toluene-2,4-diisocyanate-terminated polypropylene oxide glycol); polyisocyanates commercially available under the trade designation MONDUR or DESMODUR (for example, DESMODUR XP7100 and DESMODUR 3300) from Bayer Corporation (Pittsburgh, Pa.); and combinations thereof.

Of these, particularly advantageous polyisocyanates include aliphatic polyisocyanates. Aliphatic polyisocyanates were generally observed to provide superior weatherability compared with their aromatic counterparts. Particularly preferred species include dicyclohexylmethane diisocyanate, isophorone diisocyanate, hexamethylene diisocyanate, trimethylhexamethylene diisocyanate, along with copolymers and mixtures thereof.

In preferred embodiments, the thermoplastic polyurethane is substantially non-crosslinked. In these cases, the above polyisocyanates and polyols are generally diisocyanates and diols, respectively, where each of these components has a functionality of two. Such functionalities produce long linear polymeric chains that allow the polyurethane material to be reprocessed at elevated temperatures. Notwithstanding, small degrees of crosslinking may be acceptable in some instances.

The linear polymeric chains of a thermoplastic polyurethane generally contain long, low-polarity "soft segments" and shorter, high-polarity "hard segments." In some embodiments, the soft and hard segments are synthesized in a one-step reaction that includes an isocyanate, short-chain diol, and long-chain diol. Upon conversion, the isocyanate and short-chain diol collectively form the hard segment, while the long-chain diol alone forms the soft segment. At ambient conditions, the hard segments form crystalline or pseudo-crystalline regions in the microstructure of the polyurethane, accounting for its elasticity. The soft segments provide a continuous matrix that enables facile elongation of the polyurethane material. The soft segment portion may or may not be the majority phase of the polyurethane composition.

The long-chain diol has a weight average molecular weight significantly greater than that of the short-chain diol. In some embodiments, for example, the long-chain diol has a weight average molecular weight of at least 500 g/mol, at least 600 g/mol, at least 700 g/mol, at least 800 g/mol, at least 900 g/mol, or at least 950 g/mol.

In some embodiments, the thermoplastic polyurethane has a hard segment content of at least 50 percent, at least 51 percent, at least 52 percent, at least 53 percent, at least 54 percent, at least 55 percent, at least 56 percent, at least 57 percent, at least 58 percent, at least 59 percent, at least 60 percent, at least 61 percent, at least 62 percent, at least 63 percent, at least 64 percent, at least 65 percent, at least 66 percent, at least 67 percent, at least 68 percent, at least 69 percent, or at least 70 percent by weight, relative to the overall weight of the thermoplastic polyurethane. In some embodiments, the thermoplastic polyurethane has a hard segment content of at most 90 percent, at most 89 percent, at most 88 percent, at most 87 percent, at most 86 percent, at most 85 percent, at most 84 percent, at most 83 percent, at most 82 percent, at most 81 percent, at most 80 percent, at most 79 percent, at most 78 percent, at most 77 percent, at most 76 percent, at most 75 percent, at most 74 percent, at most 73 percent, at most 72 percent, at most 71 percent, or at most 70 percent by weight, relative to the overall weight of the thermoplastic polyurethane.

The hard segment content can be calculated from the relative weights of the starting materials used in preparing the thermoplastic polyurethane. In the embodiments described herein, the hard segment content is determined using the following formula:

Hard segment wt %=100%×[wt. of (short-chain diol+diisocyanate)]/[wt. of (polyol+diisocyanate)]

While the relative amounts of long-chain and short-chain diols can vary over a wide range depending on the hardness desired, the overall relative amounts of polyisocyanate to polyol (which includes all diols) are generally selected to be stoichiometric equivalent amounts. In some instances, it may be desired to use an excess of one component, such as polyol, to minimize unreacted remnant of the other component.

The kinetics of the polymerization between the polyisocyanate and polyol species is typically accelerated with the help of a suitable catalyst. In exemplary embodiments, the hard coat composition is prepared using any of a wide variety of known urethane catalysts, including dibutyltin dilaurate, dibutyltin diacetate, stannous octoate, triethylene diamine, zirconium catalysts, and bismuth catalysts.

The overall molecular weight of the polyurethane after polymerization should be sufficiently high to provide high strength and elongation properties for thermoforming applications, yet not so high that melt processing of the polymer is unduly complicated. In exemplary embodiments, the aliphatic thermoplastic polyurethane can have a weight average molecular weight of at least 100,000 g/mol, at least 150,000 g/mol, at least 200,000 g/mol, at least 250,000 g/mol, at least 300,000 g/mol, at least 350,000 g/mol, or at least 400,000 g/mol. In exemplary embodiments, the aliphatic thermoplastic polyurethane can have a weight average molecular weight of at most 800,000 g/mol, at most 750,000 g/mol, at most 700,000 g/mol, at most 650,000 g/mol, or at most 600,000 g/mol.

In some embodiments, the thermoplastic polyurethane has a substantially monomodal molecular weight distribution. Such a distribution can be achieved, for example, using the methods disclosed in U.S. Pat. No. 8,128,779 (Ho, et al.). The polydispersity index of the polyurethane, defined as the ratio between the weight average molecular weight and number average molecular weight, can be at least 1.1, at least 1.5, at least 2.0, at least 2.5 or at least 3.0. As to the same or alternative embodiments, the polydispersity index of the polyurethane can be at most 6.0, at most 5.7, at least 5.5, at most 5.2 or at least 5.0.

It is desirable for the disclosed hard coat compositions to display a hardness that is sufficient to avoid or substantially reduce the degradation of its surface finish when subjected to harsh environmental conditions over extended periods of time. For example, for automotive paint protection applications, the hard coat composition should be hard enough to resist scratching from stones, sand, road debris, and bugs during the expected lifetime of the protective film. In exemplary embodiments, the hard coat composition has a Shore D hardness of at least 70, at least 71, at least 72, at least 73, at least 74, at least 75, at least 76, at least 77, at least 78, at least 79, at least 80, at least 81, at least 82, at least 83, at least 84, at least 85, at least 86, at least 87, at least 88, at least 89, at least 90, at least 91, at least 92, at least 93, at least 94, or at least 95.

Exemplary embodiments of the hard coat composition have mechanical properties enabling the hard coat layer to be stretched over substrates having complex curvatures in three dimensions. Because of the variety of different substrates that could be encountered, it is desirable for the hard coat composition to be capable of being stretched uniformly over a substantial distance without breaking. At 25 degrees Celsius, the hard coat composition optionally has an Elongation at Break test result (whose specifics shall be defined in the forthcoming Examples) of at least 140 percent, at least 145 percent, at least 150 percent, at least 155 percent, at least 160 percent, at least 165 percent, at least 170 percent, at least 175 percent, at least 180 percent, at least 185 percent, at least 190 percent, at least 200 percent, at least 205 percent, at least 210 percent, at least 215 percent, at least 220 percent, at least 225 percent, at least 230 percent, at least 235 percent, at least 240 percent, at least 245 percent, or at least 250 percent.

The ability of the provided hard coat compositions to elongate without breakage can be substantially enhanced at high temperatures. Further, the degree of enhancement was unexpected. When processed at thermoforming temperatures, for example, films of the provided hard coat composition were observed to be stretched to a far greater extent than that of conventional hard coat films. At 50 degrees Celsius, for example, the provided hard coat compositions can have an Elongation at Break test result of at least 160 percent, at least 165 percent, at least 170 percent, at least 175 percent, at least 180 percent, at least 185 percent, at least 190 percent, at least 195 percent, at least 200 percent, at least 205 percent, at least 210 percent, at least 215 percent, at least 220 percent, at least 225 percent, at least 235 percent, at least 240 percent, at least 245 percent, at least 250 percent, at least 260 percent, at least 270 percent, at least 280 percent, at least 290 percent, at least 300 percent, at least 310 percent, at least 320 percent, or at least 330 percent.

In dynamic mechanical analysis, tan δ (or the ratio between the storage and loss moduli, $E''/E'$) is a measure of the amount of deformational energy that is dissipated as heat per cycle at a glass transition temperature of a given polymer. In some embodiments, the provided hard coat compositions display a tan δ peak of at least 0.7, at least 0.75, at least 0.8, at least 0.85, or at least 0.9. In the same or alternative embodiments, the provided hard coat compositions display a tan δ peak of at most 1.5, at most 1.45, at most 1.4, at most 1.35, or at most 1.3.

Polyurethanes with the above tan δ values have performed well in dual vacuum thermoforming applications, while displaying low memory. Memory, which results from polymer molecules being retained in a state of stress after being cooled, can be undesirable in thermoforming applications if it stresses the bond between a hard coat and an underlying layer or substrate. The provided hard coat compositions display glassy, elastic behavior at ambient conditions, characterized by comparatively low tan δ. At 25 degree Celsius, for example, tan δ can be less than 0.4, less than 0.35, less than 0.3, less than 0.25, or less than 0.20.

In some embodiments, dual vacuum thermoforming of the hard coat composition, along with its associated composite film, occurs at a temperature of at least 25, at least 35, at least 40, at least 50, or at least 60 degrees Celsius. In some embodiments, the dual vacuum thermoforming of the composite film occurs at a temperature of at most 180, at most 170, at most 165, at most 160, at most 150, or at most 140 degrees Celsius.

Dual vacuum thermoforming, also sometimes referred to as Three-dimension Overlay Method ("TOM"), can be carried out using any suitable instrument known to one of skill in the art. Such instruments include vacuum molding machines manufactured by Fuse Vacuum Forming Company in Japan. Further aspects of dual vacuum thermoforming are described in U.S. Patent Publication No. 2011/10229681 (Sakamoto et al.).

Base Layer Compositions

In some embodiments, the base layer 108 is made from a polymer capable of being stretched over a given substrate to be protected, such as an aliphatic thermoplastic polyurethane or polyvinylchloride.

Adhesive Compositions

In an exemplary embodiment, the adhesive layer is a pressure sensitive adhesive that is normally tacky at ambient conditions. Suitable pressure sensitive adhesives can be based on polyacrylates, synthetic and natural rubbers, polybutadiene and copolymers or polyisoprenes and copolymers. Silicone based adhesives such as polydimethylsiloxane and polymethylphenylsiloxane may also be used. Particularly preferred pressure sensitive adhesives include polyacrylate-based adhesives, which can display advantageous properties as high degrees of clarity, UV-stability and aging resistance. Polyacrylate adhesives that are suitable for protective film applications are described, for example, in U.S. Pat. No. 4,418,120 (Kealy et al.); RE24,906 (Ulrich); U.S. Pat. No. 4,619,867 (Charbonneau et al.); U.S. Pat. No. 4,835,217 (Haskett et al.); and International Publication No. WO 87/00189 (Bonk et al.).

Preferably, the polyacrylate pressure sensitive adhesive comprises a crosslinkable copolymer of a C4-C12 alkylacrylate and an acrylic acid. The adhesive can be used with or without a crosslinker. Useful crosslinking reactions include chemical crosslinking and ionic crosslinking. The chemical crosslinker could include polyaziridine and/or bisamide and the ionic crosslinker may include metal ions of aluminum, zinc, zirconium, or a mixture thereof. A mixture of chemical crosslinker and ionic crosslinker can also be used. In some embodiments, the polyacrylate pressure sensitive adhesive includes a tackifier such as rosin ester. Adhesives useful in the invention may also contain additives such as ground glass, titanium dioxide, silica, glass beads, waxes, tackifiers, low molecular weight thermoplastics, oligomeric species, plasticizers, pigments, metallic flakes and metallic powders as long as they are provided in an amount that does not unduly degrade the quality of the adhesive bond to the surface.

As an alternative to pressure sensitive adhesives, the adhesive layer 214 may include a hot melt adhesive, which is not tacky at room temperature but becomes tacky upon heating. Such adhesives include acrylics, ethylene vinyl acetate, and polyurethane materials.

Methods of Making

The manufacture of the composite films shown in FIGS. 1-4 involves forming two or more layers, as described, that are subsequently coupled to each other. The layers constituting the composite films may be prepared in parallel or in series.

The hard coat layer in particular may be formed using conventional techniques known to those of ordinary skill in the art. Such techniques include, for example, coating or extruding onto a substrate. One skilled in the art can coat or extrude the disclosed hardenable compositions onto a substrate using either batch or continuous techniques.

In a preferred method, a thermoplastic polyurethane layer is formed by extruding it at an elevated temperature through an extrusion die. The thermoplastic polyurethane layer may also be formed by casting or otherwise molding (for example, injection molding) the thermoplastic polyurethane into the shape desired.

If desired, the hard coat layer and one or more intermediate layers may be coupled by laminating the layers to each other at elevated temperature and pressure. For example, one major surface of the hard coat layer may be cold laminated under pressure to one major surface of the intermediate layer, while at least the one major surface of the hard coat layer is, or both the hard coat layer and the intermediate layer are at an elevated temperature that is sufficiently high to facilitate adequate bonding between the two layers. In a "cold laminating" process, the layers are laminated together between two nip surfaces near an ambient temperature environment (that is, the layers are not kept in an intentionally heated environment during the laminating process).

Advantageously, the use of chilled surfaces may eliminate, or at least help reduce, warping of the layers resulting from the laminating process. At the same time, the major surfaces that make contact at the interface between the polyurethane layers remain at the elevated temperature long enough to be sufficiently bonded together by the laminating pressure exerted by the nip surfaces. Cold laminating may be accomplished by laminating a newly extruded hard coat layer directly onto a preformed intermediate layer, while the hard coat composition retains significant heat from the extrusion process. Optionally, the intermediate layer is releasably bonded to a carrier web or liner to provide additional structural strength.

Alternatively, the hard coat layer may be bonded to an intermediate layer along their respective major surfaces using a hot laminating process. In this process, the initial temperatures of the layers are too low to sustain adequate bonding between them and at least one major surface of either the hard coat layer, intermediate layer, or both is heated and pressure applied to facilitate bonding between the hard coat layer and the intermediate layer. Typically, minimum temperatures and pressures for bonding the layers together using either the cold or hot laminating process, are at least about 93 degrees Celsius and at least about 10.3 N/cm², respectively.

In some embodiments, it may be desirable to corona treat (using, for example, air or nitrogen), a major surface of an extruded hard coat layer prior to bonding the major surface to an adhesive layer. Such treatment can improve adhesion between the hard coat layer and the adhesive layer.

Further details relating to the fabrication and processing of the hard coat compositions described herein are described in U.S. Pat. No. 8,128,779 (Ho et al.).

The provided compositions, films, and methods thereof can be further exemplified by the following non-exhaustive list of embodiments, A-AP:

A. A hard coat composition including: an aliphatic thermoplastic polyurethane having a hard segment content in the range from at least 57 percent, and increments of 1 percent, up to and including 80 percent by weight and any range therebetween, where the hard coat composition has a Shore D hardness of at least 70 and an Elongation at Break test result at 25 degrees Celsius of at least 150 percent.

B. The hard coat composition of embodiment A, where the aliphatic thermoplastic polyurethane has a hard segment content ranging from 60 percent to 75 percent.

C. The hard coat composition of embodiment B, where the aliphatic thermoplastic polyurethane has a hard segment content ranging from 62 percent to 72 percent.

D. The hard coat composition of any one of embodiments A-C, where the hard coat composition has an Elongation at Break test result at 25 degrees Celsius of at least 175 percent.

E. The hard coat composition of embodiment D, where the hard coat composition has an Elongation at Break test result at 25 degrees Celsius of at least 200 percent.

F. The hard coat composition of any one of embodiments A-E, where the hard coat composition has a Shore D hardness of at least 75.

G. The hard coat composition of embodiment F, where the hard coat composition has a Shore D hardness of at least 80.

H. A composite film including: a hard coat layer having opposing first and second major surfaces and including the hard coat composition of any one of embodiments A-G; and an adhesive layer extending across at least a portion of the second major surface.

I. The composite film of embodiment H, where the adhesive layer includes a pressure sensitive adhesive.

J. The composite film of embodiment H, where the adhesive layer includes a hot melt adhesive.

K. The composite film of any one of embodiments H-J, where the aliphatic thermoplastic polyurethane is the reaction product of a polyol and an aliphatic isocyanate.

L. The composite film of embodiment K, where the polyol is selected from the group consisting of: aliphatic polyester polyols, polycaprolactone polyols, polycarbonate polyols, polyether polyols, polyolefin polyols, and copolymers and mixtures thereof.

M. The composite film of embodiment K or L, where the aliphatic isocyanate is selected from the group consisting of: dicyclohexylmethane diisocyanate, isophorone diisocyanate, hexamethylene diisocyanate, trimethylhexamethylene diisocyanate, and copolymers and mixtures thereof.

N. The composite film of any one of embodiments H-M, where the aliphatic thermoplastic polyurethane displays a tan delta ranging from about 0.7 to 1.5.

O. The composite film of embodiment N, where the aliphatic thermoplastic polyurethane displays a tan delta ranging from about 0.8 to 1.4.

P. The composite film of embodiment 0, where the aliphatic thermoplastic polyurethane displays a tan delta ranging from about 0.9 to 1.3.

Q. The composite film of any one of embodiments H-P, where the hard coat layer has a thickness ranging from 5 micrometers to 300 micrometers.

R. The composite film of embodiment Q, where the hard coat layer has a thickness ranging from 10 micrometers to 200 micrometers.

S. The composite film of embodiment R, where the hard coat layer has a thickness ranging from 50 micrometers to 100 micrometers.

T. The composite film of any one of embodiments H-S, where the aliphatic thermoplastic polyurethane has a weight average molecular weight ranging from 100,000 g/mol to 800,000 g/mol.

U. The composite film of embodiment T, where the aliphatic thermoplastic polyurethane has a weight average molecular weight ranging from 300,000 g/mol to 700,000 g/mol.

V. The composite film of embodiment U, where the aliphatic thermoplastic polyurethane has a weight average molecular weight ranging from 400,000 g/mol to 600,000 g/mol.

W. The composite film of any one of embodiments H-V, where the aliphatic thermoplastic polyurethane has a substantially monomodal molecular weight distribution, with a polydispersity index ranging from 2.0 to 6.0.

X. The composite film of embodiment W, where the aliphatic thermoplastic polyurethane has polydispersity index ranging from 2.5 to 5.5.

Y. The composite film of embodiment X, where the aliphatic thermoplastic polyurethane has polydispersity index ranging from 3.0 to 5.0.

Z. The composite film of any one of embodiments H-Y, where the hard coat composition further includes at least one pigment.

AA. The composite film of any one of embodiments H-Z, where the first major surface is exposed.

AB. The composite film of any one of embodiments H-AA, further including a release liner disposed on at least a portion of the adhesive layer whereby the adhesive layer is interposed between the hard coat layer and the release liner.

AC. The composite film of any one of embodiment H-AB, further including an intermediate layer interposed between the hard coat layer and the adhesive layer.

AD. The composite film of embodiment AC, where the intermediate layer is selected from the group consisting of: a thermoplastic polymer layer, metal vapor coat, color coat, ink coat, and combinations thereof.

AE. A coated article including a substrate and a composite film according to any one of embodiments H-AD at least partially coating the substrate.

AF. The coated article of embodiment AE, where the substrate includes an injection molded part.

AG. A method of protecting a three-dimensional substrate including: providing a composite film including: a hard coat layer having opposing first and second major surfaces and including an aliphatic polyurethane layer having a hard segment content in the range from at least 57 percent, and increments of 1 percent, up to and including 80 percent by weight and any range therebetween, the hard coat layer having a Shore D hardness of at least 70; a base layer disposed on the first major surface; and an adhesive layer disposed on the second major surface; and thermoforming the composite film over the three-dimensional substrate at a thermoforming temperature exceeding 50 degrees Celsius, where the composite film displays an Elongation at Break test result of at least 250 percent at the thermoforming temperature.

AH. The method of embodiment AG, where the composite film displays an Elongation at Break test result of at least 275 percent at the thermoforming temperature.

AI. The method of embodiment AH, where the composite film displays an Elongation at Break test result of at least 300 percent at the thermoforming temperature.

AJ. The method of any one of embodiments AG-AI, where the hard coat composition has a Shore D hardness of at least 75.

AK. The method of embodiment AJ, where the hard coat composition has a Shore D hardness of at least 80.

AL. The method of any one of embodiments AG-AK, where the base layer is selected from the group consisting of: a thermoplastic polymer layer, metal vapor coat, color coat, ink coat, and combinations thereof.

AM. The method of any one of embodiments AG-AL, where thermoforming the composite film includes dual vacuum thermoforming the composite film.

AN. The method of embodiment AM, where the dual vacuum thermoforming occurs at a temperature ranging from 25 degrees Celsius to 180 degrees Celsius.

AO. The method of embodiment AN, where the dual vacuum thermoforming occurs at a temperature ranging from 40 degrees Celsius to 160 degrees Celsius.

AP. The method of embodiment AO, where the dual vacuum thermoforming occurs at a temperature ranging from 60 degrees Celsius to 140 degrees Celsius.

EXAMPLES

Test Methods

Hardness

The Shore D hardness of the hard coat layer of the composite films was measured according to ASTM D2240-05 test protocol.

Tensile Strength & Elongation at Break

The tensile properties of the hard coat compositions were evaluated using the procedures described in ASTM Test Method D 882, "Tensile Properties of Thin Plastic Sheeting" using an INSTRON tensile tester. Tensile strength at break and % elongation at break were measured. Young's Modulus was also measured from the initial linear portion of the stress-strain curve. Specimens were 2.54 cm in width and were tested at a crosshead speed of 30.5 cm/min with a 1.27 cm jaw separation. Testing was conducted at five different temperatures; 25° C., 50° C., 75° C., 100° C. and 125° C. to simulate thermoforming conditions.

Dynamic Mechanical Thermal Analysis

The elastic moduli of thermoplastic films were measured from −50° C. to 150° C. in tension using Rheometric's Solid Analyzer (RSA II) at 1 Hz (6.28 rad/sec). A typical thin strip of sample (6.865 mm width by 22.8 mm length and thickness range from 0.012 mm to 0.022 mm was mounted in the clamps and tightened. Pre-determined amplitude and frequency was applied to the thin film sample and the stress response of the material was measured. E', elastic modulus and E", loss modulus were measured. The ratio of E"/E', also referred to Tan delta, E', and E" vs. temperature were obtained. $T_g$ was obtained at the maximum of Tan delta. $T_m$ was also reported.

Gel Permeation Chromatography (GPC) Molecular Weight/Distribution Analysis

Average molecular weight and molecular weight distribution of prepared polyurethane materials were obtained generally using the procedure described in ASTM D5296-11. The instrument used was a Model 1100 from Agilent Technologies, Hewlett-Packard-Strasse, Waldbronn, Germany. The column set was 2×Jordi Gel DVB Mixed Bed (15 cm×4.6 mm I.D.) and the detector was differential refractor index (DRI). 10 mL of chloroform was added to approximately 25-30 mg of sample to give solutions of approximately 0.25-0.3% w/v concentration. Solutions were swirled for at least 14 hours and then filtered using 0.2 micron PTFE syringe filters. 30 microliters was injected and the eluent was collected at 0.3 milliliter per minute. The weight average molecular weight was reported along with polydispersity.

Example 1

A polyurethane composition was prepared by individually feeding polyester polyol FOMREZ 44, 1,4 butane diol, TINUVIN 292, TINUVIN 571, T12 as Part A, and DESMODUR 'W' as part B, in a co-rotating twin screw extruder. The extruder was a 58-mm co-rotating twin screw extruder (available from Davis-Standard, Pawcatuck, Conn., USA). The extruder had 13 barrel zones that were independently heated. A vacuum pump was applied to the extruder. The barrel temperatures, die, and neck tube temperatures, are listed in the table below. A 66 cm wide drop die was connected to the output end of the twin screw extruder.

| Extrusion Conditions |
| --- |
| Extruder RPM (RPM): 135 |
| Zone 2: 193° C. |
| Zone 3: 193° C. |
| Zone 4: 193° C. |
| Zone 5: 188° C. |
| Zone 6: 182° C. |
| Zone 7: 177° C. |
| Zone 8: 160° C. |
| Zone 9: 160° C. |
| Zone 10: 150° C. |
| Zone 11: 150° C. |
| Zone 12: 150° C. |
| Zone 13: 150° C. |
| Neck Tube Temp: 163° C. |
| Die Temp: 163° C. |

The detailed weight percent of the components are summarized in Table 2. The polymerized mixture was extruded using a standard drop die and cast onto a polyester film (50 micrometer oriented polyester film) at a thickness of approximately 20 micrometers and 64 centimeter in width. The melt curtain was cast vertically into a nip consisting of a rubber roll and a metal casting roll and then wound into a roll. The Shore D hardness of the polyurethane was 60D. Thermal tensile and elongation tests and DMTA were conducted. The results were reported in Table 3 below.

TABLE 1

Materials

| Designation | Description | Supplier |
| --- | --- | --- |
| 1,4 butane diol | Chain extender | Arco Chemical, Newtown Square, PA |
| CAPA 2100A | Caprolactone polyol (mw = 1000) | Solvay S. A., Brussels, Belgium |
| DESMODUR W | Bis(4-isocyanotocyclohexyl) methane, an aliphatic secondary diisocyanate | Bayer Corp., Whippany, NJ |

TABLE 1-continued

Materials

| Designation | Description | Supplier |
|---|---|---|
| FOMREZ 44-111 | Polyester polyol | Chemtura Corp., Middlebury, CT |
| TINUVIN-292 | Hindered amine | BASF SE, Ludwigshafen, Germany |
| TINUVIN-571 | UV light absorber | BASF SE, Ludwigshafen, Germany |
| T12 | Dibutyl tin dilaurate catalyst | Air Products, Allentown, PA |

TABLE 2

Formulations and properties

| | Example 1 | Example 2 | Example 3 | Example 4 | Example 5 |
|---|---|---|---|---|---|
| Part A | | | | | |
| CAPA 2100 (wt %) | 0.00% | 0.00% | 62.60% | 0.00% | 0.00% |
| FOMREZ- 44-112 (wt %) | 62.60% | 70.70% | 0.00% | 57.80% | 51.80% |
| 1,4 butane diol (wt %) | 27.20% | 20.00% | 27.20% | 31.00% | 36.00% |
| T12 (wt %) | 0.20% | 0.30% | 0.20% | 0.20% | 0.20% |
| TINUVIN 292 (wt %) | 4.00% | 3.60% | 4.00% | 4.50% | 5.00% |
| TINUVIN 571 (wt %) | 6.00% | 5.40% | 6.00% | 6.50% | 7.00% |
| Part B | | | | | |
| DESMODUR W (wt % relative to Part A) | 80.00% | 100.00% | 100.00% | 110.00% | 123.00% |
| Properties | | | | | |
| NCO/OH Curing Ratio | 1.04/1 | 1.04/1 | 1.04/1 | 1.04/1 | 1.04/1 |
| Hard Segment wt % | 55.30% | 63.60% | 63.60% | 67.14% | 71.30% |
| Shore Hardness | 65D | 80D | 80D | ~85D | ~90D |
| Wt. Average Molecular Weight | — | 431,000 | 551,000 | — | — |
| Polydispersity | — | 3.48 | 4.38 | — | — |

Examples 2-5

Four polyurethane films were extruded as described in Example 1 except the compositions were adjusted as described in Table 2 above. The Shore D hardnesses of the polyurethanes in Examples 2-5 were 80D, 80D, 84D, and 90D, respectively. Thermal, tensile, elongation and DMTA properties were measured and are reported in Table 3.

Comparative Example C1

The components of Composition C in Table 2 of U.S. Pat. No. 6,607,831 (Ho, et al.) were thoroughly mixed together to form a uniform solution. The solution was then coated, using a notch bar coater, to a thickness of about 76 micrometers on a release coated (silicone) polyester film. The coated composition was dried and partially cured for 2 minutes in an oven at 85° C., 2 minutes in an oven at 121° C., and 2 minutes in an oven at 130° C. to form a dry film having a thickness of about 12 micrometers. The amount of free isocyanate groups left in the partially cured film was 63.7% by weight as determined according to the test method described above. Composition B, also described in Table 2 of U.S. Pat. No. 6,607,831, was then prepared and coated over the partially cured film of Composition C with a notch bar coater to a wet thickness of about 101 micrometers. The coated composition was dried according the conditions for Composition C above to obtain a dried film thickness of about 20 micrometers. The resulting composite film was visibly clear and the two layers bonded well to each other and passed the Surface Layer Adhesion Test. Thermal tensile and elongation tests and DMTA were conducted, and the results are summarized in Table 3 below.

Comparative Example C2

A polyurethane coating dispersion was prepared by mixing 83.78 grams of a water-based, polycarbonate-based polyurethane dispersion (ALBERDINGK U933 available from Alberdingk Boley, Inc., Charlotte, N.C.), 0.03 grams of a pH adjuster (aminomethyl propanol available as AMP-95 from Angus Chemical Co., Buffalo Grove, Ill.), 0.19 grams of a sulfosuccinate type anionic surfactant (Triton GR-7M available from Dow Chemical Company, Midland Mich.), 8.47 grams of butyl carbitol (available from Eastman Chemical Co.), 1.08 grams of 2-ethylhexyl α-cyano-α,β'-diphenylacrylate UV light absorber, and 0.45 grams of a light stabilizer (hindered amine light stabilizer based on aminoether functionality (TINUVIN 123, Ciba Specialty Chemicals). The dispersion was diluted with de-ionized water to maintain the viscosity between 70 cps and 180 cps. Immediately prior to coating, 1.30% of an aziridine cross-linker (NEOCRYL CX-100 obtained from Neoresins (DSM) Inc., Waalwijk, Netherlands) was added under agitation. The dispersion was coated to a thickness of about 50 micrometers onto a polyester carrier web. The coated dispersion was dried and cured sequentially in separate ovens for about 0.5 minutes each. The oven temperatures were set at 121° C., 149° C., and 163° C. for the first, second, and third ovens, respectively. The resulting hard coat film was about 11-12 micrometers thick. Thermal, tensile, elongation and DMTA properties were measured and are reported in Table 3 below.

TABLE 3

|  |  | Ex. 1 | Ex. 2 | Ex. 3 | Ex. 4 | Ex. 5 | Comp Ex. C1 | Comp Ex. C2 |
|---|---|---|---|---|---|---|---|---|
| Elongation at Break | 25° C. | 420 | 237 | 232 | 210.8 | 251.5 | 96 | 161 |
|  | 50° C. | N/A | 285 | 333 | 304.6 | 250.5 | 119 | 157 |
|  | 75° C. | N/A | 426 | 440 | 390.5 | 352.8 | 106 | 169 |
|  | 100° C. | N/A | 613 | 694 | 560 | 679.1 | 109 | 187 |
|  | 125° C. | N/A | 880 | 913 | 1613 | 1435 | 102 | 219 |
| Dynamic Mechanical Thermal Analysis (DMTA) | $T_g$ (° C.) | 53.4 | 62.6 | 62.4 | 65.9 | 72.6 | 94.9 | 132.2 |
|  | $T_m$ (° C.) | 147.7 | 149.7 | 150.2 | 150.1 | 151.2 | N/A | N/A |
|  | Tan Delta Height | 0.62 | 0.98 | 1.04 | 1.14 | 1.24 | 0.52 | 0.51 |

All patents and patent applications mentioned above are hereby expressly incorporated by reference. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the following claims and their equivalents.

What is claimed is:

1. A hard coat composition comprising:
an aliphatic thermoplastic polyurethane having a hard segment content ranging from 57 percent to 80 percent by weight, wherein the hard coat composition has a Shore D hardness of at least 70 and an Elongation at Break test result at 25 degrees Celsius of at least 150 percent, and wherein the aliphatic thermoplastic polyurethane is characterized by linear polymeric chains having a weight average molecular weight ranging from 100,000 g/mol to 800,000 g/mol after polymerization.

2. The hard coat composition of claim 1, wherein the aliphatic thermoplastic polyurethane has a hard segment content ranging from 60 percent to 75 percent.

3. The hard coat composition of claim 2, wherein the aliphatic thermoplastic polyurethane has a hard segment content ranging from 62 percent to 72 percent.

4. The hard coat composition of claim 1, wherein the hard coat composition has a Shore D hardness of at least 75.

5. The hard coat composition of claim 4, wherein the hard coat composition has a Shore D hardness of at least 80.

6. A composite film comprising:
a hard coat layer having opposing first and second major surfaces and comprising the hard coat composition of claim 1; and
an adhesive layer extending across at least a portion of the second major surface.

7. The composite film of claim 6, wherein the aliphatic thermoplastic polyurethane is the reaction product of a polyol and an aliphatic isocyanate.

8. The composite film of claim 7, wherein the polyol is selected from the group consisting of: aliphatic polyester polyols, polycaprolactone polyols, polycarbonate polyols, polyether polyols, polyolefin polyols, and copolymers and mixtures thereof.

9. The composite film of claim 7, wherein the aliphatic isocyanate is selected from the group consisting of: dicyclohexylmethane diisocyanate, isophorone diisocyanate, hexamethylene diisocyanate, trimethylhexamethylene diisocyanate, and copolymers and mixtures thereof.

10. The composite film of claim 6, wherein the aliphatic thermoplastic polyurethane displays a tan delta ranging from about 0.7 to 1.5.

11. The composite film of claim 6, wherein the aliphatic thermoplastic polyurethane has a weight average molecular weight ranging from 100,000 g/mol to 800,000 g/mol.

12. The composite film of claim 6, wherein the aliphatic thermoplastic polyurethane has a substantially monomodal molecular weight distribution, with a polydispersity index ranging from 2.0 to 6.0.

13. A method of protecting a three-dimensional substrate comprising:
providing a composite film comprising
a hard coat layer having opposing first and second major surfaces and comprised of a hard coat composition comprising an aliphatic thermoplastic polyurethane having a hard segment content ranging from 57 percent to 80 percent by weight, wherein the hard coat composition has a Shore D hardness of at least 70 and an Elongation at Break test result at 25 degrees Celsius of at least 150 percent, and wherein the aliphatic thermoplastic polyurethane is characterized by linear polymeric chains having a weight average molecular weight ranging from 100,000 g/mol to 800,000 g/mol after polymerization; and
an adhesive layer extending across at least a portion of the second major surface; and
thermoforming the composite film over the three-dimensional substrate at a thermoforming temperature exceeding 50 degrees Celsius, wherein the composite film displays an Elongation at Break test result of at least 250 percent at the thermoforming temperature.

14. The method of claim 13, wherein thermoforming the composite film comprises dual vacuum thermoforming the composite film.

15. The method of claim 14, wherein the dual vacuum thermoforming occurs at a temperature ranging from 60 degrees Celsius to 165 degrees Celsius.

16. The hard coat composition of claim 2, wherein the hard coat composition has a Shore D hardness of at least 75.

17. A composite film comprising:
a hard coat layer having opposing first and second major surfaces and comprising the hard coat composition of claim 16; and
an adhesive layer extending across at least a portion of the second major surface.

18. The composite film of claim 6, wherein the aliphatic thermoplastic polyurethane displays a tan delta ranging from about 0.7 to 1.5, and the aliphatic thermoplastic polyurethane has a weight average molecular weight ranging from 100,000 g/mol to 800,000 g/mol.

19. The composite film of claim 6, wherein the aliphatic thermoplastic polyurethane displays a tan delta ranging from about 0.7 to 1.5, the aliphatic thermoplastic polyurethane has a weight average molecular weight ranging from 100,000 g/mol to 800,000 g/mol, and the aliphatic thermoplastic polyurethane has a substantially monomodal molecular weight distribution, with a polydispersity index ranging from 2.0 to 6.0.

20. The composite film of claim 17, wherein the aliphatic thermoplastic polyurethane displays a tan delta ranging from about 0.7 to 1.5, the aliphatic thermoplastic polyurethane has a weight average molecular weight ranging from 100,000 g/mol to 800,000 g/mol, and the aliphatic thermoplastic polyurethane has a substantially monomodal molecular weight distribution, with a polydispersity index ranging from 2.0 to 6.0.

* * * * *